United States Patent [19]

Krikor

[11] Patent Number: 4,466,062
[45] Date of Patent: Aug. 14, 1984

[54] APPARATUS FOR CCIS DATA TRANSFER BETWEEN A CPU AND A PLURALITY OF DATA TERMINAL EQUIPMENT

[75] Inventor: Krikor A. Krikor, Glendale, Ariz.

[73] Assignee: GTE Automatic Electric Inc., Northlake, Ill.

[21] Appl. No.: 412,617

[22] Filed: Aug. 30, 1982

[51] Int. Cl.³ .............................................. G06F 3/00
[52] U.S. Cl. ................................ 364/200; 179/18 ES
[58] Field of Search ............ 179/18 B, 18 EA, 18 ES; 364/200 MS File

[56] References Cited

U.S. PATENT DOCUMENTS 4,166,929  9/1979  Sheinbein ................... 179/18 ES X
4,249,239  2/1981  Mescam et al. ..................... 364/200

*Primary Examiner*—Raulfe B. Zache
*Attorney, Agent, or Firm*—Frank J. Bogacz; Peter Xiarhos

[57] ABSTRACT

A single CCIS central processing unit is employed to receive and transmit CCIS data from a central switching office to other CCIS offices via modems, or digital trunk units and T1 spans. This apparatus facilitates orderly and timely data exchange between a CCIS central processing unit and a plurality of data terminal equipment. Every 10 milliseconds the CCIS CPU scans all the data terminal equipment. However, particular data transmissions require interaction at a more rapid rate. The present invention provides for a high priority data transmission from the terminal equipment to the central processing unit intermingled with regular priority messages.

10 Claims, 2 Drawing Figures

4,466,062

APPARATUS FOR CCIS DATA TRANSFER BETWEEN A CPU AND A PLURALITY OF DATA TERMINAL EQUIPMENT

BACKGROUND OF THE INVENTION

The present invention pertains to CCIS data transmission between data terminal equipment and a CCIS central processing unit and more particularly to data collection of regularly scanned input/output sources intermingled with randomly generated high priority data.

Data transfer between a CPU and a plurality data terminal equipment is typically accomplished via a buffering array. The CPU can then examine each of the number of buffers and transfer data on a cyclic or scanning basis.

In a CCIS (common channel interoffice signaling) configuration, data messages representing various events in the processing of trunk telephone traffic are transmitted via the data terminal equipment. Typical scanning type operation is adequate to provide the central processing unit of a CCIS sub-system with adequate response time for the transmission or the return data message. However, certain telephony events such as answer signaling require CPU response within 100 microseconds. These response times are much more rapid than a single CPU can scan a number of such data sources. In telephone signaling, the loss of such a signal can result in loss of the telephone call itself and more importantly in loss of revenue for the telephone call to the telephone operating company.

Accordingly, it is the object of the present invention to provide a CCIS data collection system where a single operating CPU interfaces with a plurality of terminal equipments on a scanning basis and simultaneously providing for the immediate transfer of data for certain time critical events.

SUMMARY OF THE INVENTION

The CCIS sub-system transmits signaling and supervisory data to T1 spans, digital trunk units and modems via a plurality of terminal equipment control circuits. The terminal equipment control circuits are microprocessor controlled and perform the interface functions required to account for the peculiarities of each of these devices.

In the present invention, two CPUs operate the CCIS sub-system. Only one of the CPUs does the data manipulation at a particular time, the other continually runs self-diagnostics in order to remain viable as a "hot-standby" unit in the event that the CPU presently on line encounter a malfunction.

Each CPU is connected to a corresponding unit register which permits access of a multiplexer device for the transmission of data to and from selected terminal equipment and control circuits. In addition, bus cross-over circuitry is connected to the CPU which permits the active on-line CPU to transmit data via the mate CPU's bus structure to the terminal equipment. Each CPU is connected to a corresponding memory for instruction and data storage, which also can be accessed by the other CPU. Two multiplexer units are connected to the active CPU. Each of the multiplexer units handles up to 8 terminal equipment control circuits. For each terminal equipment control circuit there is a connection to corresponding terminal equipment buffer interface. The terminal equipment buffer interface provides for buffering the input/output of each terminal equipment control circuit and transmitting data to and from the CPU at the appropriate time. The terminal equipment bus interface may send or receive data from either the terminal equipment control circuit or the active CPU. A bus extender is connected between the two multiplexer units and each corresponding bus cross-over unit. The multiplexer units at the appropriate time gate the bus structure of the CPU to the appropriate terminal equipment bus interface which is to send or receive data.

The terminal equipment control circuit also transmits data to and from the terminal equipment buffer interface (TEBI). The TEBI performs the data transmission by means of transmit and receive buffers. The transmit buffer sends data from the terminal equipment to the CPU. The receive buffer transfers data from the CPU to the terminal equipment. During each 10 millisecond period, the CPU scans each of the TEBIs to determine whether any data is present to be collected and analyzed. If data is present or if data needs to be sent to a terminal equipment, the appropriate buffer is loaded or unloaded by the CPU. Associated with each buffer is load or unload and control circuitry for cyclically operating each buffer until all necessary data is either transmitted or received. Similar load and unload control circuitry is provided for access of the buffers by the terminal equipment control circuitry.

For high priority messages transmitted from the terminal equipment to the CPU such as the answer signal, the CPU must respond within a time period of 100 microseconds. Therefore, the TEBI provides a means of signaling CPU that a time critical data message is waiting in the buffer. This signal is transmitted from the terminal equipment to gating and latching means which generate and interrupt to the CPU for immediate servicing. The CPU may then collect the data message and analyze it to determine what action is to be taken or performed within a critical time period. Optionally, the CPU may set latching means which exclude any high priority message sent by the terminal equipment bus interface.

DESCRIPTION OF THE PREFERRED EMBODIMENT

Figure 1:
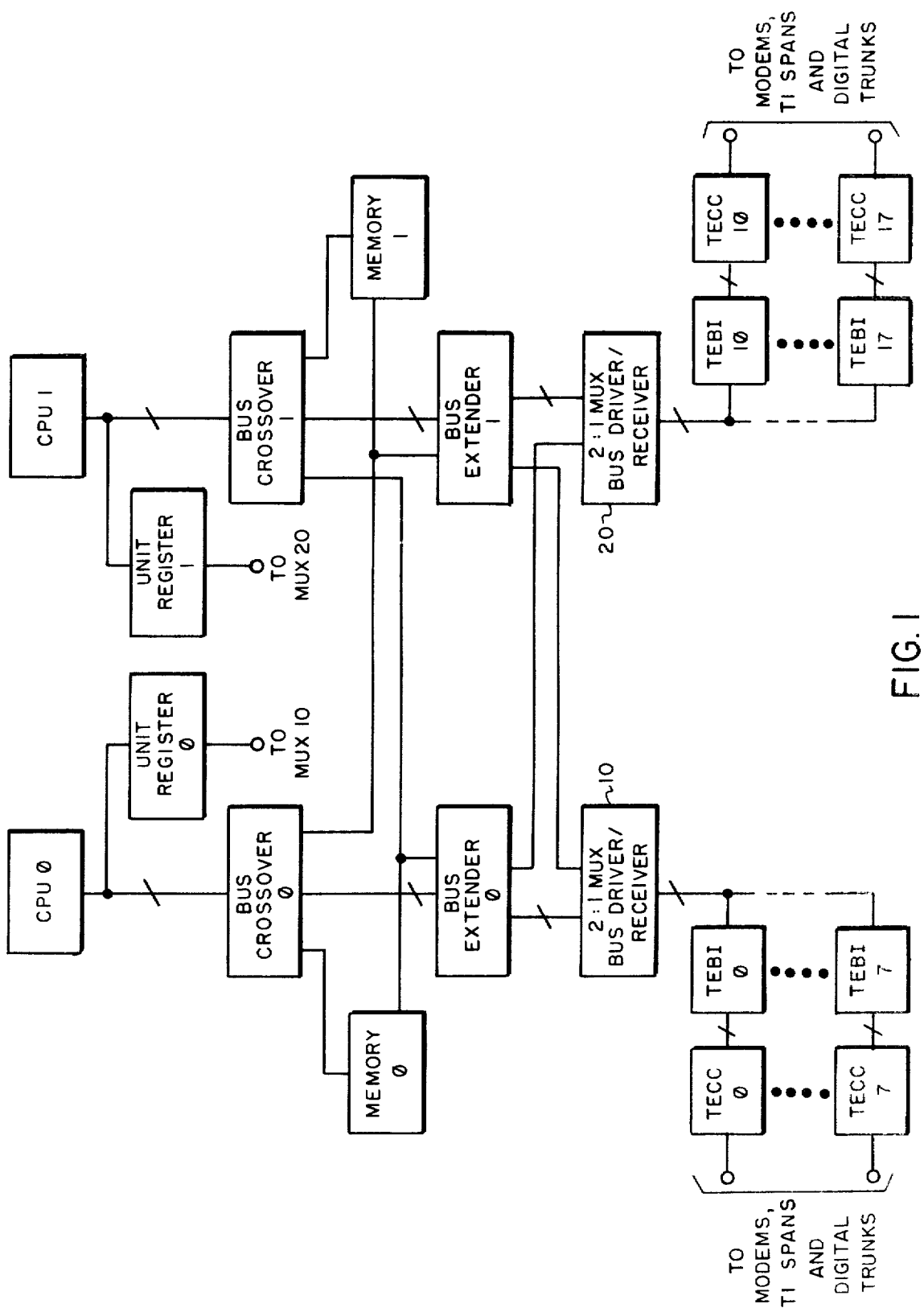
FIG. 1 is a block diagram of a Common Channel Interoffice Signaling system.

Referring to FIG. 1, a CCIS data link sub-system of a central switching office is shown. The control circuitry of the data link sub-system includes two Intel 8086 microprocessors, CPU0 and CPU1. Only one of these processors is active at a particular time. The other processor is a backup processor which operates upon detection of a fault in the active processor. The backup processor is a "hot" standby processor which runs self-diagnostics until such time as it becomes active and the other becomes standby.

Each CPU functions to collect data received or transmitted to or from analog and digital sources, such as modems and T1 spans or digital trunk units. This data is collected and analyzed and retransmitted to another processor group. CPU0 and 1 are respectively connected to the bus extender units 0 and 1, which function to provide for a multiplicity of connections to each CPU's address and data buses. Connected between each CPU and bus extender is a corresponding bus cross-over network which provides the ability to operate circuitry of one portion of the CCIS sub-system with the CPU of the opposite portion of the sub-system. For example, bus extender 0 may be operated by CPU1. In addition, each CPU has a corresponding memory connected via the bus cross-over circuit. This memory contains the instruction and data stores necessary to operate each CPU for data collection, analysis and transfer.

Each bus extender circuit is connected to two multiplexer units 10 and 20. Each multiplexer unit may handle up to eight sources of digital or analog information input. The two multiplexing units 10 and 20 may be operated by either CPU. Each CPU may handle a total of sixteen sources of data input/output. CPU0 and CPU1 are respectively connected to unit registers 0 and 1. Unit registers 0 and 1 are connected to multiplexers 10 and 20 respectively. The unit registers are operated under the CPU's instructions to select which particular transmission source is connected to multiplexers 10 and 20 for the collection or transmission of data by the corresponding CPU.

Each source is connected to the CPUs through its corresponding multiplexer by a terminal equipment bus interface circuit (TEBI 0-7, 10-17). A terminal equipment control circuit (TECC) is connected between each TEBI and a data source. The TECCs serve to control the particular data link device such as a modem (analog 2400 bits per second or digital 4000 bits per second) and may be implemented with an Intel 8085 microprocessor and associated logic. The TECCs perform such functions as: data link interface via a modem or a digital trunk unit; error detection and correction; data link synchronization, recovery and diagnostic functions; and bufferring, reformatting and prioritizing of information.

FIG. 1 represents a CCIS configuration for a particular telephone central office. CCIS data includes trunk signaling and supervision data from voice trunks. Instead of transmitting this data in a conventional manner over the trunk itself, the signaling data is sent via a data link arrangement between two CCIS telephone central offices. This results in more efficient use of the trunks than otherwise would be possible. Each CCIS sub-system may both transmit and receive data from another CCIS sub-system of another central office.

Normally, every 10 milliseconds each terminal equipment buffer interface (TEBI) is scanned by a CPU to determine whether any incoming data has arrived. This type of processing is adequate for most signals transmitted, such as the called party's dialed digits. However, certain signals such as an answer signal must be processed within 100 microseconds, a considerably faster time than the scanning rate. As a result, the present configuration provides for a normal 10 millisecond input scan while simultaneously providing for a high priority message transmission or receipt for each time critical signals as the answer signal.

Figure 2:
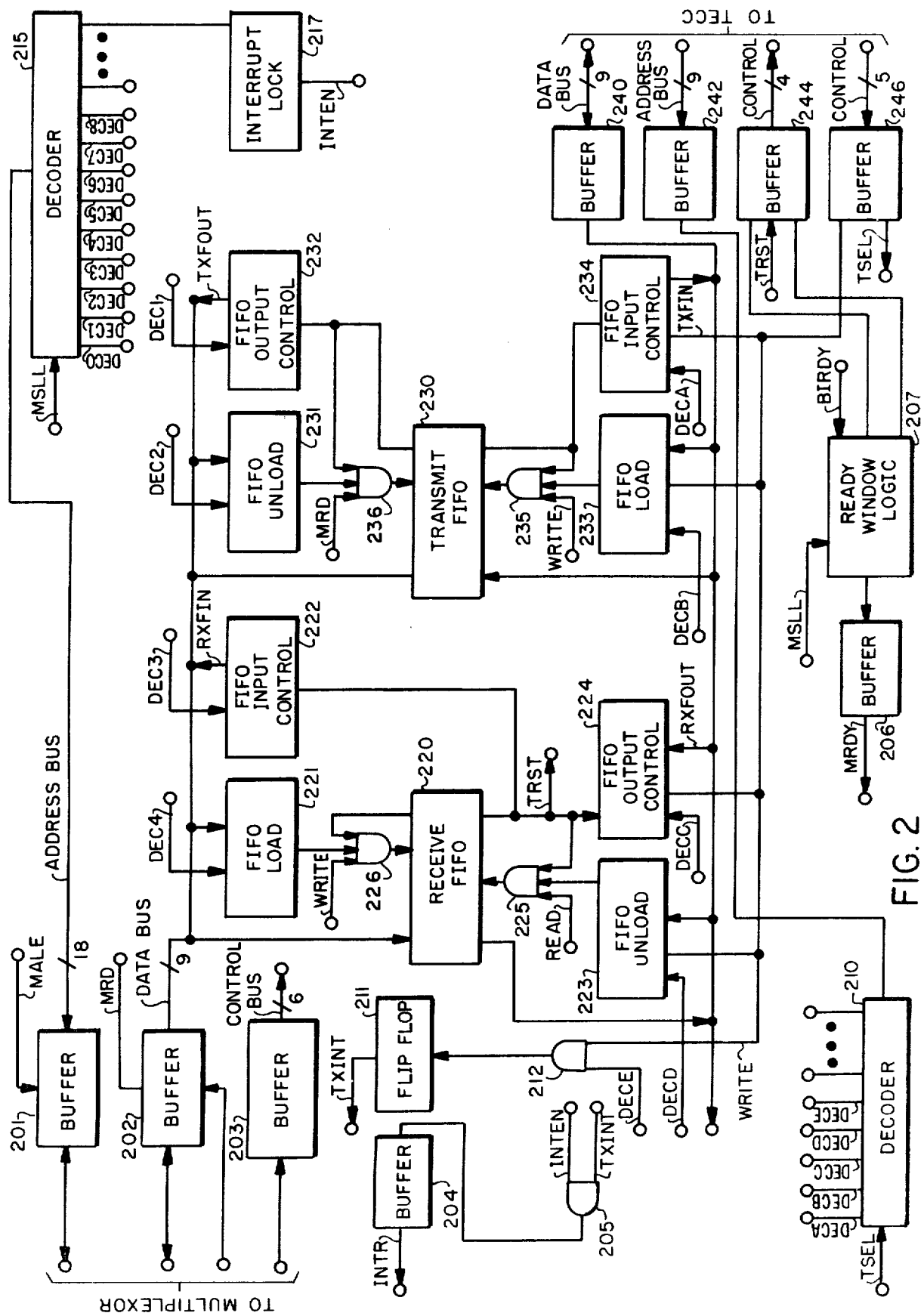
FIG. 2 is a schematic diagram of the terminal equipment buffer interface circuit embodying the principles of operation of the present invention.

Referring to FIG. 2, the receive FIFO 220 and transmit FIFO 230 control the transmission of data messages between terminal equipment and the CPU. This terminal equipment may interface to modems T1 spans through digital trunk units. CCIS data messages are transmitted through these buffers either to or from the terminal equipment. The circuit shown in FIG. 2 is duplicated for each TEBI shown in FIG. 1.

The data bus is connected between the CPU and FIFOs 230 and 220 via buffer arrangement 202. FIFOs 220 and 230 are also connected to the terminal equipment control circuit (TECC) via the output data bus via buffer arrangement 240. The CPU's address bus is connected to decoder 215 via buffer arrangement 201. The outputs of decoder 215 provide for controlling the operation of FIFOs 230 and 230 for the CPU's access. The CPU's control bus is also connected to the TEBI via buffer arrangement 203. The address, data and control buses connecting the TEBI to the CPU are 18, 9 and 6 bits respectively.

A 9-bit address and a 9-bit data bus connects the terminal equipment control circuit (TECC) to the TEBI via buffer arrangements 240 and 242 respectively. In addition, 9-bit control bus connects the TEBI with the TECC via buffer arrangements 244 and 246. The address bus from the TECC is connected via buffer arrangement 242 to decoder 210. A control signal TSEL is transmitted via buffer arrangement 246 to decoder 210 and provides control for the outputs of decoder 210. Decoded outputs of decoder 210 operate FIFO control circuitry 223, 224, 233 and 234 to control loading and unloading of the FIFOs with data transmitted to and from the TECC. In addition, one of the decodes of decoder 210 is connected to AND gate 212 for generating an interrupt request signal via flip-flop 211. An interrupt enable and gate 205 provides for the transmission of the interrupt signal to the CPU via buffer 204. The CPU controls whether it will accept an interrupt by the INTEN signal which is generated by interrupt logic 217 in response to one of the decode outputs of decoder 215 and if set, inhibits AND gate 205 from operating.

In order for the CPU to obtain control of the TEBI, a control signal MSLL is transmitted via the control bus and buffer arrangement 203 to the ready window logic 207. The TEBI responds with a ready signal MRDY to the CPU. As a result, the CPU now has control of the TEBI and can transmit or receive data from it.

The receive and transmit FIFOs 220 and 230 are 64 words of 12 bits each. They may be implemented employing a number of monolithic memory FIFO integrated circuits Part No. 67401. At 10 millisecond intervals, the CPU specifically scans all transmit FIFOs 230 of each TEBI for CCIS data. Data will have been loaded into the transmit FIFO 230 via the data bus and buffer arrangement 240 under control of the TECC. The loading of data from the TECC to the transmit FIFO 230 will be controlled by the FIFO load circuitry 233 and FIFO input control circuitry 234 connected between transmit FIFO 230 and the control bus of the TECC. When data is in the transmit FIFO 230, the TXFOUT signal of the output control 232 will be set. The CPU will scan and read a particular sense point representing this signal and determine that it must receive data. Each TEBI will be scanned in a similar fashion to determine whether it has data ready to be received by the CPU.

If the transmit FIFO 230 has data to be sent to the CPU, the CPU will read one byte of data and then interrogate the TXFOUT sense point to determine whether any data remains in the FIFO. When no further data remains to be transferred, the TXFOUT signal will reflect a logic 0.

When data is loaded into the transmit FIFO 230 by the TECC, the TECC interrogates the TXFIN sense point of the FIFO input control circuitry 234. A value of logic 1 for the TXFIN sense point indicates that the transmit FIFO 230 is ready to be loaded with data. The TECC will simply load a byte of data into the FIFO 230 and check the TXFIN sense point until it is at logic 0, indicating that the FIFO is filled with data. This scanning, and unloading scheme takes place for each TEBI circuit every 10 milliseconds.

For certain messages such as those representing answer signals, the 10 millisecond scan is ineffective for the accurate transmission of this message. Such messages as answer are termed high priority messages since, they must be processed by the CPU at a faster rate than the scanning rate. For such high priority messages, the TECC transmits a control signal via buffer arrangement 246 to decoder 210, where it is decoded and gated through to flip-flop 211. The CPU controls whether this interrupt will be accepted by transmitting a particular address to be decoded by decoder 215. Decoder 215 is connected to interrupt logic 217 which generates a signal INTEN, interrupt enable. If the enable is set by the CPU, any interrupt request from the TECC will be gated through gate 205. If the interrupt enable is reset by the CPU, INTEN logic 0, no interrupt will be received by the CPU. The CPU sees the request for immediate service for a priority message. If the transmit FIFO 230 was full when this interrupt was received for a priority message, then FIFO 230 will be unloaded and the TECC will then be able to transfer its high priority message. If FIFO 230 was empty the transmission would take place immediately. In either case, the CPU will continuously unload FIFO 230 until it is empty and only then reset the TXINT interrupt.

For the transmission of CCIS data from the CPU through the TECC to another CCIS office, receive FIFO 220 is employed in a similar fashion to FIFO 230. The CPU will read the RXFIN sense point of FIFO input control circuit 222. A logic 1 value of RXFIN indicates that the FIFO is ready to be loaded with data by the CPU. In contrast, a logic 0 indicates that the CPU must wait until the FIFO is unloaded before transmitting any more data. The loading is accomplished by the transmission of the address so that decoder 215 provides the DEC 4 signal to FIFO load circuit 221, thereby enabling each successive byte to be loaded into FIFO 220. This operation will take place similar to the loading of FIFO 230 by the TECC. When the sense point RXFIN indicates that FIFO 220 is filled, CPU will will terminate the transmission of data. As a result of this loading, input control 222 generates an interrupt TRST. The TRST interrupt signal is transmitted via buffer arrangement 244 to the TECC central processing unit to alert it that a message is waiting in the FIFO 220.

Next, the TECC must unload the data from FIFO 220 for subsequent transmission to a T1 span or modem, for example. The TECC interrogates the RXFOUT signal of output control 224. A logic 1 value of RXFOUT sense point indicates that FIFO 220 contains data to be transmitted by the TECC. If FIFO 220 has data to be unloaded, the TECC will, via the input control bus enable decoder 210, provide decode DECD to enable FIFO 220 to transmit one byte of data at a time via buffer arrangement 240 to the TECC. This unloading process will cyclically occur until sense point RXFOUT indicates that FIFO 220 is empty. As a result, the data is transmitted from TECC to its destination and the interrupt signal TRST is reset.

The above circuitry may be implemented with 7400 schotkky logic integrated circuits of low power schotkky or standard integrated circuits.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a CCIS system, apparatus for data transfer between a computer and a plurality of data terminal equipment comprising:
    a duplex pair of CPUs including an active and ready standby CPU;
    corresponding first and second CPU buses connected to said CPU;
    corresponding first and second multiplexer units, each connected to each of said CPUs via said corresponding CPU buses for connecting one of said plurality of terminal equipments with said active CPU;
    a plurality of bus interface means connected between said first and second multiplexer units and said plurality of terminal equipment, each of said plurality of bus interface means connected to a corresponding one of said plurality of terminal equipment;
    each of said bus interface means including:
        means for transmitting connected between said terminal equipment and one of said multiplexer units via said CPU buses for collecting and retransmitting data to said active CPU;
        means for periodically detecting said transfer of data from any one of said terminal equipment to said means for transmitting, said means for periodically detecting operated to periodically examine said means for transmitting for said data; and
        second means for detecting connected between said particular terminal equipment and said active CPU via, said corresponding CPU bus and said second means for detecting operated in response to said data transfer, from said terminal equipment to said means for transmitting, to indicate to said CPU that high priority data has been transferred to said means for transmitting, whereby said CPU is immediately interrupted and said CPU initiates an immediate transfer of said data from said means for transmitting to said active CPU for storage, analysis and response.

2. Apparatus for data transfer as claimed in claim 1, wherein each of said bus interface means includes a FIFO buffer connected between said terminal equipment and said CPU, and operated in response to said transmitted data of said terminal equipment to sequentially store data for retransmission to said CPU.

3. Apparatus for data transfer as claimed in claim 2, wherein each of said bus interface means further includes:
    terminal equipment bus means connected between said buffer and said corresponding terminal equipment;
    means for loading said buffer connected between said terminal equipment and said buffer; and input control means for detecting a condition of said buffer being filled with data whereby said means for loading and said input control means are alternatively operated to load said buffer and sequentially test for a data full condition.

4. Apparatus for data transfer as claimed in claim 2, wherein each of said bus interface means further includes:

unloading means connected between said buffer and said active CPU via said corresponding CPU bus; and output control means connected between said buffer and said active CPU via said corresponding CPU bus and operated in response to said active CPU to control the sequential transfer of data from said buffer to said CPU and to detect when all said data has been transferred.

5. Apparatus for data transfer as claimed in claim 1, wherein said duplex pair of CPUs further includes:

first and second CPUs;

corresponding bus cross-overs, each connected to said corresponding CPU via said corresponding CPU bus and to said other CPU via said other CPU bus for connecting said first CPU to said CPU bus corresponding to said second CPU and for connecting said second CPU to said CPU bus corresponding to said first CPU;

corresponding first and second memories connected to each corresponding bus cross-over;

corresponding first and second bus extenders connected to each said bus cross-over and to each said memory;

first and second registers connected between said corresponding CPU and said corresponding multiplexers and each operated to selectively enable said active CPU buses to be connected to specific ones of said plurality of terminal equipment for transmitting data from any of said ones of said plurality of terminal equipment to said active CPU via said corresponding CPU bus.

6. Apparatus for data transfer as claimed in claim 5, wherein said duplex pair of CPUs includes first and second CPUs interconnected via said bus cross-overs whereby said first CPU is active and said second CPU functions as a steady standby or alternatively said second CPU is active and said first CPU functions as a ready standby.

7. Apparatus for data transfer as claimed in claim 1, wherein said second means for detecting includes:

gating means connected to said CPU;

means for inhibiting connected between said active CPU and said gating means and said means for inhibiting operated in response to said active CPU to prevent the transmission of said immediate interrupt to said CPU.

8. Apparatus as claimed in claim 7, wherein said second means for detecting further includes means for interrupting connected between said active CPU and said corresponding terminal equipment operated to indicate to said active CPU that said high priority data is available for transfer to said CPU.

9. Apparatus for data transfer as claimed in claim 8, wherein said means for interrupting further includes latching means connected between said terminal equipment and said gating means and operated in response to said terminal equipment to activate said request for high priority data transfer.

10. Apparatus for data transfer as claimed in claim 1, wherein there is further included:

first and second pluralities of terminal equipment;

corresponding first and second pluralities of said bus interface units, each bus interface unit connected to a corresponding one of said plurality of terminal equipment;

each said bus interface unit of said first plurality connected via first CPU bus to said first multiplexer; and each bus interface unit of said second plurality connected via second CPU bus to said second multiplexer whereby either of said duplex pair of CPUs transfers data between any of said bus interface units of said first and second plurality.

* * * * *